United States Patent [19]

McCall

[11] Patent Number: 4,718,403

[45] Date of Patent: Jan. 12, 1988

[54] CONTROL FOR WATER HEATER SYSTEM

[75] Inventor: Danny McCall, Hickory, N.C.

[73] Assignee: Exemplar, Inc., Hickory, N.C.

[21] Appl. No.: 786,663

[22] Filed: Oct. 11, 1985

[51] Int. Cl.⁴ .............................................. F24J 2/42
[52] U.S. Cl. ................................... 126/427; 126/419; 126/422; 126/437
[58] Field of Search ............... 126/400, 419, 422, 427, 126/432, 436, 437; 237/8 R; 236/46 R, 47

[56] References Cited

U.S. PATENT DOCUMENTS

| | | |
|---|---|---|
| 3,996,919 | 12/1976 | Hepp . |
| 4,052,000 | 10/1977 | Honikman ............................ 126/427 |
| 4,131,158 | 12/1978 | Abhat et al. . |
| 4,191,166 | 3/1980 | Saarem et al. . |
| 4,339,930 | 7/1982 | Kirts . |
| 4,349,012 | 9/1982 | Schildknecht ........................ 126/427 |
| 4,371,029 | 2/1983 | Lindner et al. . |
| 4,399,807 | 8/1983 | Buckley et al. . |
| 4,508,261 | 4/1985 | Blank ................................ 236/46 R |

FOREIGN PATENT DOCUMENTS 57-58026  4/1982  Japan .................................. 126/422

*Primary Examiner*—Larry Jones
*Assistant Examiner*—Noah Kamen
*Attorney, Agent, or Firm*—Shefte, Pinckney & Sawyer

[57] ABSTRACT

A control arrangement for a water heater system that includes a water heater having a heating element, an alternate heat source which is preferably a solar collector panel, and a heat exchange and storage unit containing a phase change material therein for storing heat energy from the alternate heat source and for transmitting the stored heat to the water in the water heater when available and when needed. The control arrangement includes means for programming the system to operate in one or more of several different operating modes, including a mode in which the heating element is deenergized at all times, a mode in which priority is given to using stored energy rather than heating element energy, a mode in which both the stored energy and the heating element are utilized simultaneously, and a mode in which the heating element is deenergized during predetermined time periods. The control may also be programmed to select which modes are used during selected time periods of each day of the week.

19 Claims, 5 Drawing Figures

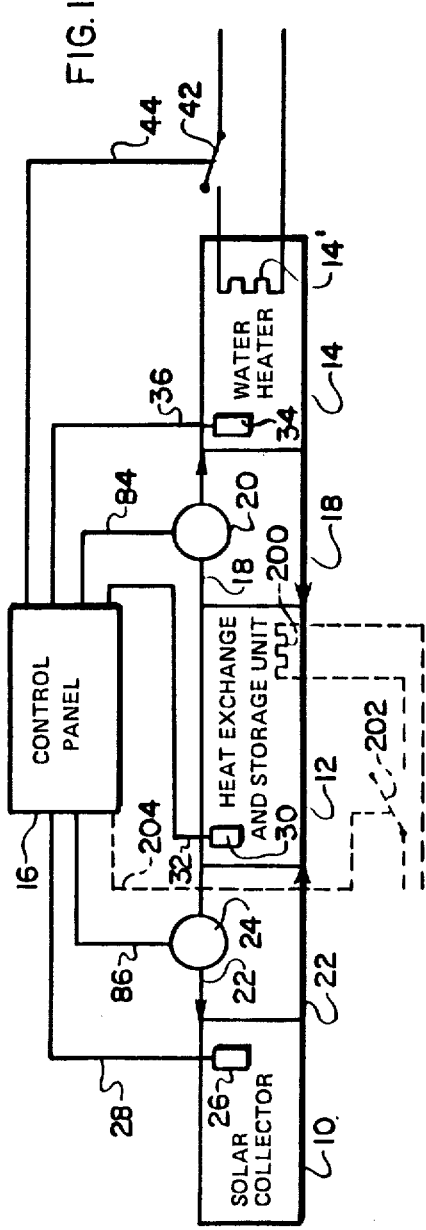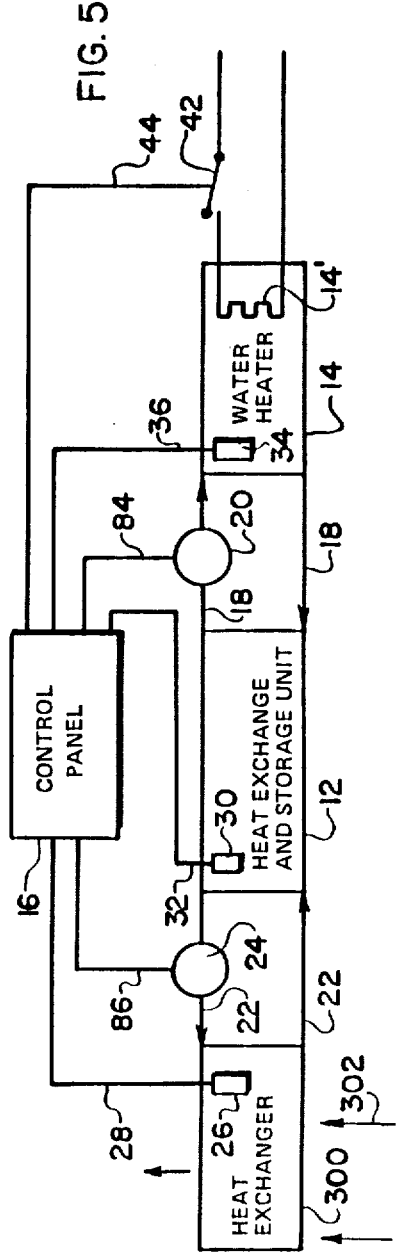

CONTROL FOR WATER HEATER SYSTEM

BACKGROUND OF THE INVENTION

The present invention relates generally to a control arrangement for a water heating system particularly a system in which a conventional water heater provided with its own conventional heating element is used, and a system in which an alternate source of heat, that may be a solar collector panel or another type of heat source, is provided, with the entire system being controlled in a programmed manner that substantially increases the efficiency of the system and permits a variety of alternative modes of operation that can accommodate the use of the system by users having a variety of lifestyles.

In its simplest form, a conventional water heater used in a residence or the like includes a heating element, such as an electrical element or a gas heating unit, which is thermostatically controlled to heat the water stored in the water heater when it is below a predetermined desired temperature. It is well-known that such conventional systems necessarily involve high energy costs, and some efforts have been made to modify these systems to reduce energy costs. One familiar example is the use of a timer that may be set to energize the water heater heating elements only during "off-peak" hours when the costs of electrical energy is reduced, but these arrangements have several disadvantages, such as not having hot water readily available during certain time periods when it may be needed by the user.

It is also known that solar collectors can be used to heat water to reduce energy costs by utilizing solar energy as a partial alternative to the more expensive conventional heating elements. Some of these known systems include a heat storage material, usually in the form of a phase change material, which acts to store heat obtained from a solar collector, and this stored heat is made available through a control system to heat the water. For example, in Abhat U.S. Pat. No. 4,131,158 a temperature responsive control system is provided in which water from a well or public water supply is heated by stored solar energy when the temperature of the stored solar energy is greater than the temperature of the water. Other solar systems utilizing the benefits of a phase change material to store solar energy are disclosed in Lindner U.S. Pat. No. 4,371,029 and Hepp U.S. Pat. No. 3,986,919.

In solar systems of types generally described above, some attention has been given to a control for increasing the efficiency of the system by shutting down the circulation of the fluid from the collector to the heat storage unit when the temperature in the solar panel liquid circuit is less than the temperature in the storage vessel. Examples of control systems of this general type are disclosed in U.S. Pat. Nos. 4,191,166, Jaarem, Buckley 4,399,807 and Kirts 4,339,930.

Finally, in co-pending U.S. patent application Ser. No. 765,141, filed Aug. 13, 1985, an improved control arrangement is provided which includes a first control for disenabling the pump for the potable water in the water heater fluid circuit when the temperature of the potable water reaches a predetermined maximum temperature, and a second control operates independently of the first control to disenable the pump in the solar heated fluid circuit to disenable such pump whenever the temperature of the fluid in the solar fluid circuit is equal to or less than the temperature of the phase change material, or when the temperature of the phase change material reaches a predetermined maximum temperature.

While all of the foregoing control arrangements provide internal, usually automatic, controls for utilizing alternate energy sources such as a solar energy to augment the heating of water in water systems and the like, none of them permit any significant variation in the control of the overall system by the user of the system, and none of these provide an adequate arrangement by which the user can program the system to operate in different modes depending on the particular circumstances and needs of the user of the system.

BRIEF SUMMARY OF THE INVENTION

As set forth in greater detail herein, the present invention provides a unique control arrangement for a water heating system that utilizes an alternate heat source for heating the water, preferably but not necessarily solar energy, and that permits the user of the system to make very efficient use of the alternate heat source and to program the operation of the system to suit the specific needs of the user, which may vary considerably depending upon the life style of such user.

In the preferred embodiment of the present invention, the system includes a conventional water heater having an independent heating element (e.g. an electrically operated heating element or a gas burner), a solar panel, and a storage chamber containing a phase change material for storing solar heat energy. A first selectively operable fluid transfer system is provided for passing a fluid between the solar panel and the storage chamber to transfer available solar heat thereto, and a second selectively operable fluid transfer system is provided for transferring available heat from the storage chamber to the water heater. A control means is provided which includes a settable timer means and sensors for sensing the temperature in the solar panel (Temp. 1) and the temperature of the water in the water heater (Temp. 2), and the control means includes a programmable means, preferably a computer, which permits the user to selectively set the operation of the overall system in several different modes, selectively operable in preselected time periods.

One selectable mode of operation would be to maintain the water heater element in a deenergized condition whenever Temp. 1 is greater than Temp. 2, whereby the high costs of operating the water heater heating element is avoided whenever inexpensive solar energy is available from the storage chamber. This mode could be selected by the user to give priority to the utilization of stored solar energy over energy obtained from the water heater heating element. Another selectable mode of operation would be to deenergize the water heater heating element during predetermined time periods determined by the selectively settable timer. This second mode could be selected, for example, during times that the user would not be at home and would therefore not need water heated by the water heater heating element, and the time period could be selected so that such heating element would be energized, if necessary, for a predetermined time interval (e.g. 1 hour) before the user expects to need hot water, thereby assuring the user that hot water will be available when needed even if stored solar energy is not available. A third selectable mode could be selected in which the water heater heating element is maintained in an energized condition when Temp. 2 is below a predetermined temperature (e.g. a desired hot water temperature of 140° F.) and in a deenergized condition whenever Temp. 2 is at or above said predetermined temperature. This mode would utilize available stored solar energy, but would assure the user that, at any given time, hot water at the desired predetermined temperature will be available because the water heater heating element will assure this condition even at the expense of increased energy consumption. Finally, a fourth mode can be selected in which the water heater heating element is maintained in a deenergized condition at all times, and this mode can be selected by the user during vacation periods or other periods when there is no need for hot water.

Another feature of the present invention permits the control means to be preset on a programmed timed basis whereby the aforesaid different modes of operation can be independently and separately set to be in effect during different time periods during a twenty-four hour time period, and with such settings can also be selectably set for each day of a calendar week.

The control means of the present invention may also include an override switch means that is selectively operable to immediately operate the system in the aforesaid third mode of operation and to prevent operation of the system in any other mode of operation, whereby the user can, at any time, get immediate heat applied to the water heater by its heating element.

While the preferred embodiment of the present invention uses a solar panel as the alternate heat source, the control system could also be used with other alternate heat sources. For example, the heat storage material could be heated by an alternate electrical heating that is operated from household electricity, but, by utilizing the control arrangement of the present invention, this alternate heating element would only be energized during "off-peak" hours (e.g. midnight to 4 a.m.) when the per unit cost of electrical energy is available at reduced rates, and the energy obtained is then stored in the storage chamber for subsequent use, when needed, during peak time periods to heat the water in the water heater.

BRIEF DESCRIPTION OF THE DRAWINGS

FIG. 1 is a diagrammatic illustration of the various components of the system embodying the control means of the present invention;

FIG. 5 is a diagrammatic illustration similar to FIG. 1 and showing an alternate embodiment of the present invention.

DESCRIPTION OF THE PREFERRED EMBODIMENT

Figure 2:
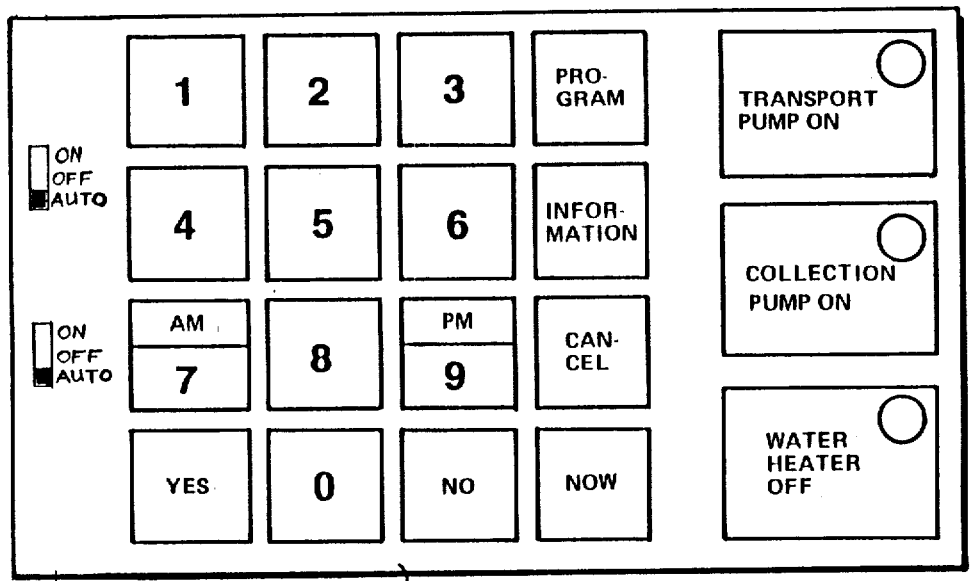
FIG. 2 is an illustration of the face plate of the control module operated by the user of the present invention.

Looking in greater detail at the accompanying drawings, FIG. 1 illustrates in diagrammatic form the arrangement of the components of the water heating energy collection and storage system embodying the present invention. Except for the control panel and the elements shown in dashed lines, the components illustrated and the arrangement thereof may be identical to those described in greater detail in the aforesaid copending U.S. patent application Ser. No. 765,141, to which reference can be made for a description in greater detail of such components and their operation.

The following summary of the components and arrangement thereof shown in FIG. 1 will serve for the purpose of understanding the present invention. The system preferably includes a solar collector unit 10, a heat exchange and heat storage unit 12, a water heating unit 14 which is preferably a conventional residential water heater having a predetermined storage capacity for heated water (e.g. 50 gallons) and having an independent electrical heating element 14' that is selectively energized and deenergized by a switch 42 that is opened and closed by a control panel 16 through electrical line 44. A first conduit arrangement 18 delivers potable water in the water heater 14 to and from the heat exchange and storage unit 12, and a pump 20 is arranged to generate the flow of potable water. A second conduit arrangement 22 extends between the collector 10 and the heat exchange and storage unit 12, and a second pump 24 is disposed to cause a flow of heat transfer liquid in the second conduit 22 to and from the heat exchange and storage unit 12 and the collector 10. A conventional temperature sensing probe 26 is disposed in the collector 10 to sense the temperature of the solar collector 10, and this probe 26 is connected by electrical line 28 to the control panel 16. A similar probe 30 is located in the heat exchange and storage unit 12 to sense the temperature of the phase change material therein, and an electrical line 32 connects the probe 30 with the control panel 16 and a third probe 34 senses the temperature of the potable water in water heater 14 and in the conduit 18, and it is connected to the control panel 16 by electrical line 36.

As described in greater detail in the aforesaid U.S. patent application Ser. No. 765,141, the heat exchange storage unit 12 may be a container substantially filled with a conventional phase change material such as paraffin wax which has the property of absorbing, storing and yielding up significant amounts of heat energy while occupying only a relatively small volume. The aforesaid first and second conduit arrangements 18 and 22 include conduit portions that pass through the phase change material in the storage unit 12, preferably in contact with one another and in contact with the phase change material, so that when the temperature of the solar collector 10 is greater than the temperature of the potable water in water heater 14 and greater than the temperature of the phase change material, this available heat can be transferred directly to the potable water in the first conduit arrangement 18 and directly to the phase change material for storage and for subsequent transfer to the potable water when needed. The operation of the pumps 20 and 24 are controlled so that pump 20 will be disenabled whenever the temperatures of the potable water reaches a predetermined maximum desired temperature (e.g. 140° F.) suitable for normal use, and so that pump 24 will be disenabled whenever the temperature of the solar panel 10 is equal to or less than the temperature of the phase change material in storage unit 12, whereby pump 24 will not be operated when it would take away stored heat in the storage unit 12. Thus, the system is designed so that solar energy, when it is available, is transferred directly to the potable water in the water heater 14 if it is below the aforesaid predetermined desired temperature, and any available solar heat energy is also transferred to the phase change material in the storage unit 12 for storage, such stored heat being available for transfer to the potable water where its temperature is below the desired level.

In accordance with the present invention, an additional control arrangement is provided for the above-described system which permits the user of the system to select one or more modes of operation for the system, and to program the system so it will be operated in selected modes under preselected conditions or during different time periods, including programming of the system for an entire calendar week with different modes of operation being available, if desired, during each day of the week. The four different modes of operation which are available through the control arrangement of the present invention are as follows:

I. Solar/Stored Energy Priority Mode—In this mode the heating element 14' in the water heater 14 is maintained in a deenergized condition whenever the temperature of the solar collector panel 10 (Temp. 1) or the temperature in storage unit 12 is greater than the temperature of the water in the water heater 14 (Temp. 2), and heating element is maintained in an energized condition whenever Temp. 2 is greater than Temp. 1 and is less than the aforesaid desired temperature level for the water in the hot water heater 14. Thus, in this mode, all available heat from the solar panel, including that stored in the storage unit 12, is utilized before the heating element 14' is energized. This mode does not offer the quickest method of heating the water in the water heater 14, but it provides significant cost savings.

II. Time Interval Delay Mode—In this mode of operation, the heating element 14' is maintained in a deenergized condition during predetermined time periods that can be selectively set by the user. By utilizing this mode, the user can reduce energy costs by not utilizing the heating element 14' during times when it is not likely that hot water will be required and by utilizing only available solar energy, and, since the time period during which this mode is operational can be preselected, the user can still be sure that hot water at the desired temperature will be available at any given time by selecting a time period that will expire prior to the time when hot water at the desired temperature will be needed. For example, if the user will need hot water at 7 a.m., the user can program the system so that this mode will be in effect from midnight to 6 a.m., during which time the heating element will be deenergized and the water will be heated by any available stored solar heat in the storage unit 12, and if, at 6 a.m., the water is not at the desired temperature, the heating element will be energized and have a full hour to add such additional heat as may be necessary.

III. Combined Solar and Backup Energy Mode—In this mode, the heating element 14' is maintained in an energized condition whenever Temp. 2 is below the aforesaid desired temperature level and is maintained in a deenergized condition whenever Temp. 2 is at or above such desired level. By using this mode, both the heating element 14' and any available solar energy may be utilized if the temperature in solar conduit 22 and the storage unit 12 are at a sufficiently high level to add heat to the water which is simultaneously heated by the heating element 14'. Thus, in this mode, the user is generally assured that hot water at the desired temperature will be generally available at any time, but this mode may not be cost-efficient because it does not allow the solar panel 10 to attain optimum levels with regard to solar energy collection and storage.

IV. Total Backup Energy Cutoff Mode—In this mode, the heating element 14' is totally deenergized at all times so that no expensive energy is utilized to heat the water in the water heater 14. This mode will generally be selected by the user during such times as it is unlikely that hot water will be needed for extended periods of time, such as when the user expects to be away on vacation or for other purposes.

The details of the circuitry for the system by which the above-described four modes can be selected and programmed by the user will be described in greater detail below, and FIG. 2 illustrates a typical face plate of a control module 46 that would be located at some convenient place in the user's home to permit input of data by the user into the control system for selection and programming of the various modes of operation. As shown in FIG. 2, the control module 46 includes a plurality of buttons having the numbers 0-9 thereon, and another group of buttons having informational words thereon, and two "on-off-auto" switches, all of which are explained below in connection with the use of the control module 46. The control module 46 includes a conventional computer voice synthesizer which is programmed to actually give the user a series of vocal instructions to which the user responds by pushing appropriate buttons on the control module 46, the instructions being programmed in a particular series that will vary to some extent depending on the response of the user.

Figure 3:
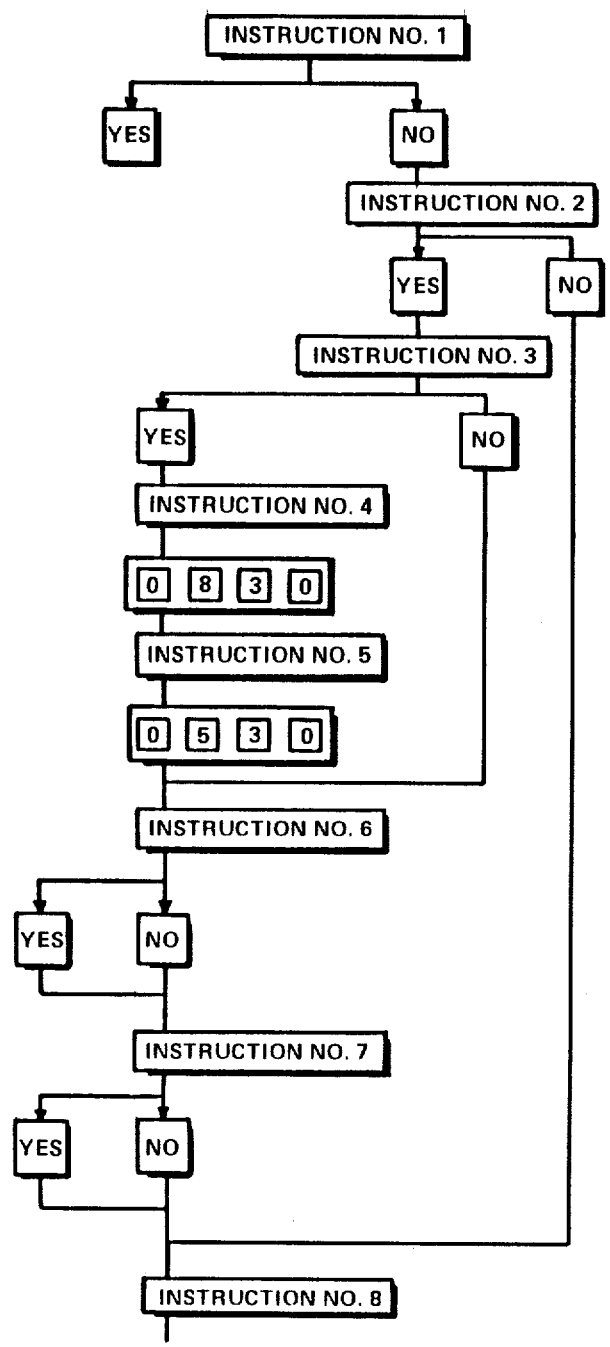
FIG. 3 is a flow chart illustrating the procedure for selecting and programming the modes of operation of the present invention.

FIG. 3 illustrates a typical flow chart showing how the user selects and programs the system using the computer system of the present invention. The computer is programmed in a conventional manner to permit the user, upon installation of the equipment or at other times if necessary, to input the correct day of the week and the correct time of the day (including whether it is a.m. or p.m.), and the system thereafter operates from this time base and keeps the correct time and day within the computer. Assuming that the system is set on 8:35 a.m. on a Sunday, the selection and programming of the various modes of operation is done in the following sequence, with reference to the flow chart shown in FIG. 3.

A. Instruction No. 1 (voice from the control module 46) is "Enter YES to set Vacation Status." If the user intends to be away on vacation or the like, the YES button on the control module 46 is pressed and the system is programmed to operate in Mode IV (Total Backup Energy Cutoff) described above with the heating element 14' deenergized at all times, until the system is programmed by the user at a subsequent time. If Mode IV is not desired, the user pushes the NO button, and the next instruction is given.

B. Instruction No. 2 is "Enter YES to program Sunday." If the user does not want to enter any program for Sunday, the NO button is pressed, and the program will automatically go to Instruction No. 8 as described below to permit programming of the next day, Monday. If the user wants to enter a program for Sunday, the YES button is pushed, and the next instruction is given.

C. Instruction No. 3 is "Enter YES to use a.m. water heater cut-off." If the user wants to program Sunday for Mode II (Time Interval Delay Mode) the YES button is pushed, and if the user does not want Mode II for Sunday, the NO button is pushed and the program proceeds automatically to Instruction No. 6, described below. If the YES button is pushed, the next instruction is given.

D. Instruction No. 4 is "Enter time of last a.m. hot water usage." The user then enters a desired time by pushing the appropriate four number buttons (e.g. "0", "8", "3" and "0"), and the computer is programmed to automatically deenergize the heating element 14 one hour before the time entered by the user (e.g. 7:30 a.m.), and the next instruction is given.

E. Instruction No. 5 is "Enter time of first p.m. hot water usage." The user again enters a desired time by pressing four number buttons (e.g. "0", "5", "3" and "0"), and the computer is programmed to automatically energize the heating element 14, if needed, one hour before the time entered (e.g. at 4:30 p.m.), and the next instruction is given. It will be noted that the programming established by the user's responses to Instructions 3, 4 and 5 establish the aforesaid Mode II.

F. Instruction No. 6 is "Enter YES to use sun stored energy during a.m. hours." If the user wants to operate the system in the above-described Mode I (Sun Stored Energy Priority Mode), the YES button is pushed and the heating element 14 will not be energized until all of the stored solar energy in the storage unit 12 has been used, and this mode is operational only during those a.m. hours when Mode II, if previously programmed by the user as described above, is not in effect. If the user does not want to program Sunday for Mode I operation, the NO button is pushed, and regardless of which of the YES or NO buttons are pushed, the next instruction is given.

G. Instruction No. 7 is "Enter YES to sun stored energy during p.m. hours." The user will respond to this Instruction in the same manner described above for Instruction No. 6 to establish Mode I for the p.m. hours, and the next instruction is given.

H. Instruction No. 8 is "Enter YES to program Monday", and if the user wants to enter a program for Monday the YES button is pressed and the computer will automatically start the programming process over by giving Instruction 1, whereupon the user goes through the same procedure described above to enter a program for Monday. The control system is designed to proceed in the same manner through each of the seven calender days of the week.

It will be apparent from the above that the user, following the indicated steps, can program the system to operate in any of Modes I, II or IV. Additionally, the user can program the system to operate in Mode III (Combine Solar and Backup Energy Mode) described above by pushing the NO button in response to all instructions, in which case the system will utilize the heating element 14 and solar energy source to jointly heat the water on a full time basis as described above in connection with the Mode III operation.

The control module 46 also includes other buttons and switches to assist the user in properly using the system. As shown in FIG. 2, the "Program" button initiates the programming or reprogramming of the system in the manner described above. The "Information" button, when pressed, will provide voice synthesized status information on all of the temperature sensors in the system, and the maximum temperatures reached for the day. Also, if it is pressed during the above-described programming sequence, it will indicate how the specific section being programmed is currently programed. The "Cancel" button can be used to exit from certain portions of the programming sequence or to skip over an instruction or to return to another instruction. The "Now" button will immediately turn on the heating element 14', if needed, for a predetermined time period (e.g. 2 hours), and pressing of the "NOW" button does affect any circuit programming already in the system. The effect obtained from pressing the "Now" button is to immediately operate the system in Mode III and to prevent operation of the system in Modes I, II or IV if they have been previously programmed into the system.

The control module also includes a plurality of LED indicator lights which, when lit, indicate the operation status of the "Transport Pump"(pump 20 in FIG. 1), the "Collection Pump"(pump 24 in FIG. 1), and the "Water Heater" element 14'. Finally, two manually operated "On-Auto-Off" switches are provided to selectively operate the pumps 20 and 24. In normal use, these switches are always set in the "Auto" or automatic position, and the "ON" and "OFF" positions are used for testing or trouble shooting the usage of the two pumps.

It will be appreciated from the description of the programming sequence above that the control arrangement of the present invention permits the user to select from a variety of four different modes of operating the system, and also permits the user to selectively program the system so that one or more of the modes are utilized during different time periods of the day, as selected by the user. Also, the user can establish a different program for each different day of the week. Thus, the control arrangement of the present invention provides to the user a wide range of the flexible variations so that different users having widely varying lifestyles can adapt the system to operate in the most economical and most desirable manner that suits the particular lifestyle of the user. While there are a large number of examples which could be given to illustrate the ability of the present invention to accommodate varying lifestyles, two specific examples will illustrate the point.

Profile A. A couple who both work from 8-5 Monday-Friday, who normally do not use hot water during the week days after 6 a.m. or until 7 p.m. in the evening, who have regular weekend routines, and who have a strong interest in maximum energy conservation. This couple would typically program the system for Monday through Friday so that it operated in Mode II (Time Interval Delay Mode) from 6 a.m. to 6 p.m., 6 a.m. being one hour before last hot water usage and permitting the couple to use the full capacity of hot water stored in the water heater for morning use, and 6 p.m. being one hour before first evening use of hot water to permit the heating element to make up any temperature deficit that the solar panel failed to provide during the day because of inclement weather or the like. The couple would also program the system to operate in Mode I (Sun Stored Energy Priority Mode) during the week days and on Saturday and Sunday. In this Mode, the couple would get the maximum cost-saving benefit of using solar energy, if available, before using the heating element 14, even though it may mean slower heat recovery for the water in the water heater.

Profile B. One of the parents works Monday through Friday with a slightly different normal routine on Fridays, and the other is at home during the day with the children. The couple are not overly concerned about energy conservation and energy costs, and emphatically want an abundant supply of hot water during the entire day on Sunday. This couple would program the system for Mode II operation from 8 a.m. (one hour before last normal a.m. hot water usage) to 2 p.m. (one hour before first normal p.m. hot water usage) on Mondays through Thursdays. For Friday, Mode II would be used from 8 a.m. to 11 a.m. because of earlier than normal hot water usage on Fridays. For Sunday, Mode III would be used to assure an abundant supply of hot water all day, and for Saturday Mode I or Mode II could be used, depending on the desire to conserve energy costs.

Figure 4:
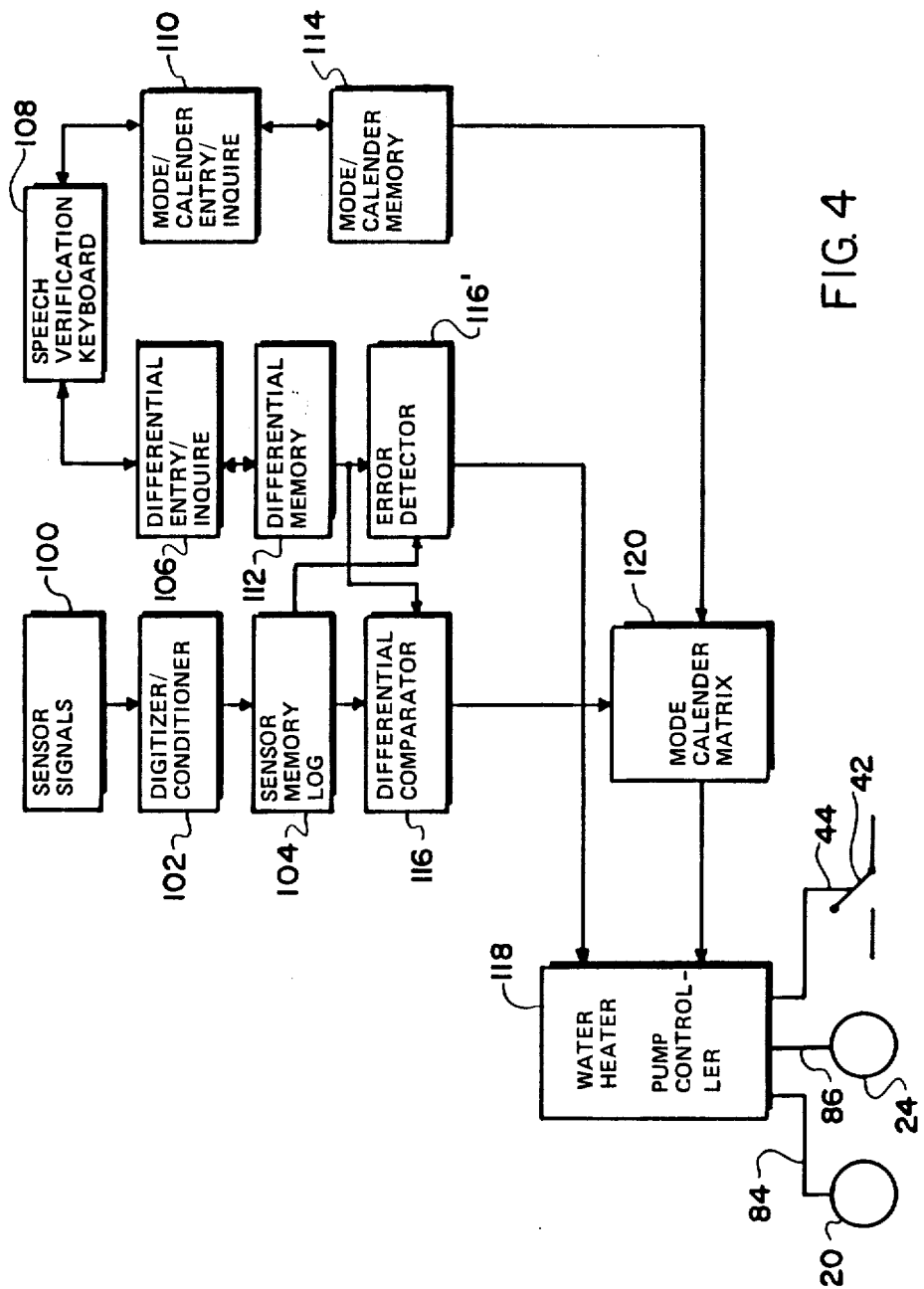
FIG. 4 is a diagrammatic illustration in block diagram form of the control circuitry of the present invention.

The circuitry of the computer for the control arrangement of the present invention is illustrated in diagrammatic block form in FIG. 4, although the details of such circuitry as such are not part of the invention claimed.

Temperatures sensed by the temperature probes 26, 30 and 34 in FIG. 1 are represented by block 100, and they are received in a low voltage, noisy analog fashion. These signals are passed to the sensor signal conditioner-digitizer 102 which removes the noise, and amplifies and linerizes the raw signal. The signals are then digitized by means of an analog-to-digital converter, and the digital sensor information is then stored in working sensor log memory 104.

Differential temperature parameter information 106 for the operative temperature differentials between the solar panel 10, the storage unit 12 and the water heater 14 is entered during unit manufacture via the speech verification/keyboard interface 108. This differential temperature parameter information defines the temperature operating differentials and limits of the system.

Mode select/calendar information 110 is entered by the user via the speech verification/keyboard interface 108 as described above, and this mode/calendar information 110 defines daily system operating conditions which customize the system to the user's particular lifestyle as described above.

Differential temperature parameter information 106 and mode select/calendar information 110 are stored in non-volatile memories 112 and 114 which protects the information from transient power outages and disturbances.

The digitized sensor information from the sensor signal memory 104 is forwarded to the sensor signal differential memory information 114 against the digitized sensor signals for high and low temperature extremes. Any detected errors are forwarded to the water heater/pump controller 118. The differential comparator 116 checks the digitized sensor signals against the differential memory information 112 for conditions which fall within the operating range conditions of the system and this information is forwarded to the differential mode/calendar matrix 120 along with the mode/calendar memory information 114. The differential mode calendar matrix 120 determines what operating status is appropriate for the current conditions, and this information is forwarded to the water heater/pump controller 118.

The water heater/pump controller 118 compares the current recommended operation status as received from the differential mode/calendar matrix 120 with the current error conditions as received from the error detector 116', and the correct current operating mode is determined and the appropriate output signals are then transmitted to the solar panel pump 24 through electrical line 86, to the potable water pump 20 through the electrical line 84, and to the water heater heating element switch 42 through the electrical line 44.

While the preferred embodiment of the present invention utilizes the above-described control arrangement in a water heating system that includes a solar panel 10 as the alternate to the heating element 14' to heat the water in the water heater 14 because of the well-known cost-saving virtues of solar energy, the control arrangement could also be used in essentially the same manner as that described above but using a different alternate heat source.

As shown by one dashed-line variation in FIG. 1, an electrical heating element 200 could be placed directly in the above-described phase change material in the storage unit 12 to apply heat energy directly thereto, and the switch 202 for operating the heating element 200 through an electrical line 204. In this instance, the solar panel 10, the fluid transfer circuit 22, the pump 24 and the temperature sensor 26 would be eliminated, and the control system is programmed so that the alternate heating element 200 is only energized during "off-peak" hours (e.g. midnight to 4 a.m.) when many utility companies offer electrical energy at significantly reduced rates per kilowatt-hour. Accordingly, during these "off-peak" hours, the alternate heating element 200 would provide heat at reduced costs that would be stored in the phase change material in the storage unit, and that would be available to heat the water in the water heater 14 in the same manner as that described above. Depending on the relationship between the heat storage capacity of the storage unit 12 and the volume of usage of the water heater 14, it will be possible in some cases to use only the heat generated by the lower cost alternate heating element 200 to heat the water, and in other cases such low-cost heat will be available in combination with heat energy provided by the heating element 14' so that the latter can be used less frequently than would be the case in the normal operation of the water heater 14.

Also, as shown in FIG. 5, the solar panel 10 in FIG. 1 could be replaced by a heat exchanger 300 through which an alternate heat source such as waste heat (e.g. heated exhaust from an industrial plant) indicated by the arrow 302 is passed to transfer such heat to the fluid transfer conduits 22 in the same manner as the solar panel 10 transfers such heat, and the control system would operate in the same manner to take advantage of the alternate heat source when it is available.

It will be apparent from the above that the control arrangement of the present invention permits a user to realize significant cost savings by utilizing an existing conventional water heater which requires no significant modification, and by utilizing any one of a number of alternate heat sources, preferably a solar panel, to at least supplement the heat energy obtained from the heating element of the water heater. Moreover, the user is provided with a variety of operating modes for the system that can be easily programmed to use different modes at different times and on different days or for different circumstances, whereby the same system as a whole can be used to accommodate varying lifestyles of different users, or to permit a single user to change the operating modes of the system at will.

It will also be appreciated that the present invention provides a unique concept of synergized heat storage so as to take full advantage of the water capacity of the existing water heater to store heat and to also combine this capacity with the substantial heat storage capacity of the phase change material and thereby provide a substantial combined reservoir of heat that is available upon demand by the user. For example, on hot days when the solar panel 10 is generating substantial amounts of heat energy at virtually no cost, this heat is utilized to heat the water in the water heater 14, which itself acts as a heat storage unit, and to store heat in the storage unit 12, so that the combined heat storage capacity for the entire system is substantially increased, perhaps even doubled if the heat storage capacity of the phase change material approximates that of the water heater 14. Because of this substantial heat storage capacity, it will be possible in many instances to use the solar panel 10 as the exclusive source of heat energy, at a very low cost, yet the control system will still permit the user to have the option of utilizing the conventional heating element 14 when necessary or when desired to insure a supply of hot water, at a desired temperature, on demand.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

I claim:

1. In a water heating solar energy collection and storage system which includes a water heating means having an independent heating element and a predetermined storage capacity for heated water, a solar panel, a heat storage chamber containing a heat storing material for storing solar heat, selectively operable first fluid transfer means for passing a fluid between said solar panel and said storage chamber to transfer available heat from said solar panel to said storage chamber, and selectively operable second fluid transfer means for passing water between said water heating means and said storage chamber to transfer available heat from said storage chamber to said water heating means, control means for said system comprising:
   (a) selectively settable timer means;
   (b) first sensor means for sensing the temperature of the fluid in said heat storage chamber (Temp. 1);
   (c) second sensor means for sensing the temperature of the water in water heating means (Temp. 2);
   (d) programmable means for selectively operating said system in the following modes of operation:
      (i) a first mode in which said heating element is maintained in a deenergized condition whenever said Temp. 1 is greater than Temp. 2;
      (ii) a second mode in which said heating element is maintained in a deenergized condition during predetermined time periods determined by the setting of said timer means;
      (iii) a third mode in which said heating element is maintained in an energized condition whenever Temp. 2 is below a predetermined temperature level and is maintained in a deenergized condition whenever Temp. 2 is at or above said predetermined temperature.

2. In a water heating solar energy collection and storage system, the control means as defined in claim 1 and further characterized in that in said first mode of operation, said heating element is maintained in an energized condition whenever Temp. 2 is greater than Temp. 1 and is less than said predetermined temperature level.

3. In a water heating solar energy collection and storage system, the control means as defined in claim 1 and further characterized in that said programmable means permits said control means to be preset for consecutive time frames of twenty-four hours each with said first, second and third operating modes being independently and separately programmable for selective operation in each said time frame.

4. In a water heating solar energy collection and storage system, the control means as defined in claim 3 and further characterized in that said programmable means permits said control system to be preset for seven consecutive time periods, each time period corresponding to a different day of the calendar week.

5. In a water heating solar energy collection and storage system, the control means as defined in claim 1 and further characterized in that said programmable means selectively operates said system in a fourth mode in which said heating element is maintained in a deenergized condition at all times.

6. In a water heating solar energy collection and storage system, the control means as defined in claim 5 and further characterized in that said control means includes an override switch means which is selectively operable to immediately operate said system in said third mode of operation and to prevent operation of said system in said first, second, and fourth modes of operation.

7. A water heating solar energy collection and storage system comprising:
   (a) a water heating means having a predetermined storage capacity for heated water and having a heating element for heating said water therein;
   (b) solar collection means for collecting and storing solar energy;
   (c) selectively operable fluid transfer means for transferring available heat from said solar collection means to said water in said water heating means; and
   (d) control means, including a selectively settable timer means, for operating said fluid transfer means whenever the temperature of said water in said water heating means is less than the temperature of said solar energy collected and stored by said solar collection means and is less than a predetermined maximum temperature level, and for maintaining said water heating element in a deenergized condition during predetermined time periods determined by the setting of said timer means whereby said water in said water heating means is heated only by available heat obtained from said solar collection means through said fluid transfer means during said predetermined time periods.

8. A water heating solar energy collection and storage system comprising:

(a) a water heating means having a predetermined storage capacity for heated water and having a heating element for heating the water therein;

(b) solar collection means for collecting and storing solar energy;

(c) selectively operable fluid transfer means for transferring available heat from said solar collection means to said water in said water heating means; and (d) control means, including a settable timer means for programming the energization of said heating element and the operation of said fluid transfer means in consecutive time frames of twenty-four hours each, with each said time frame being independently programmable to:

(i) operate said fluid transfer means whenever the temperature of said water in said water heating means is less than the temperature of said solar energy collected and stored by said solar collection means;

(ii) deenergize said heating element during a predetermined time period determined by the setting of said timer means; and (iii) energizing said heating element when the temperature of said water in said water heating means is below a predetermined temperature level.

9. A water heating solar energy collection and storage system comprising:

(a) a water heating means having a predetermined storage capacity for heated water and having a heating element for heating said water therein;

(b) solar collection means for collecting and storing solar energy;

(c) selectively operable fluid transfer means for transferring available heat from said solar collection means to said water in said water heating means; and (d) control means including settable timer means, for:

(i) selectively heating said water in said water heating means solely by energizing said heating element in response to a first predetermined set of conditions within said system;

(ii) selectively heating said water in said water heating means solely by operating said fluid transfer means in response to a second predetermined set of conditions within said system;

(iii) selectively heating said water in said water heating means by simultaneously energizing said heating element and by operating said fluid transfer means in response to a third predetermined set of conditions within said system; and (iv) maintaining said heating element in a deenergized condition during predetermined time periods determined by the setting of said timer means.

10. In a water heating energy collection and storage system which includes a water heating means having a predetermined storage capacity for heated water and having a independent heating element, an alternate heat source, heat chamber containing a heat storing material for storing heat, selectively operable transfer means for transfering available heat from said alternate heat source to said heat storing material in said storage chamber, and selectively operable second transfer means for passing water between said water heating means and said storage chamber to transfer available heat from said storage chamber to said water heating means, control means for said system comprising:

(a) selectively settable timer means;

(b) first sensor means for sensing the temperature of said heating storing material (Temp. 1);

(c) second sensor means for sensing the temperature of the water in water heating means (Temp. 2);

(d) programmable means for selectively operating said system in the following modes of operation;

(i) a first mode in which said heating element is maintained in a deenergized condition whenever said Temp. 1 is greater than Temp. 2;

(ii) a second mode in which said heating element is maintained in a deenergized condition during predetermined time periods determined by the setting of said timer means;

(iii) a third mode in which said water heater heating element is maintained in an energized condition whenever Temp. 2 is below a predetermined temperature level and is maintained in a deenergized condition whenever Temp. 2 is at or above said predetermined temperature.

11. In a water heating energy collection and storage system, the control means as defined in claim 10 and further characterized in that said alternate heat source is an alternate electrical heating element, and in that said alternate electrical heating element is operated only during predetermined time periods.

12. In a water heating energy collection and storage system, the control means as defined in claim 10 and further characterized in that in said first mode of operation, said heating element is maintained in an energized condition whenever Temp. 2 is greater than Temp. 1 and is less than said predetermined temperature level.

13. In a water heating energy collection and storage system, the control means as defined in claim 10 and further characterized in that said programmable means permits said control means to be preset for consecutive time frames of twenty-four hours each with said first, second and third operating modes being independently and separately programmable for selective operation in each said time frame.

14. In a water heating energy collection and storage system, the control means as defined in claim 13 and further characterized in that said programmable means permits said control system to be preset for seven consecutive time periods, each time period corresponding to a different day of the calendar week.

15. In a water heating energy collection and storage system, the control means as defined in claim 10 and further characterized in that said programmable means selectively operates said system in a fourth mode in which said heating element is maintained in a deenergized condition at all times.

16. In a water heating energy collection and storage system, the control means as defined in claim 15 and further characterized in that said control means includes an override switch means which is selectively operable to immediately operate said system in said third mode of operation and to prevent operation of said system in said first, second, and fourth modes of operation.

17. A water heating energy collection and storage system comprising:

(a) a water heating means having a predetermined storage capacity for heated water and having a heating element for heating said water therein;

(b) selectively operable alternate heat source means for generating heat energy;
(c) heat storage means for storing said heat energy generated by said alternate heat source, said heat storage means including a material for storing heat energy and means for transferring the heat energy generated by said alternate heat source to said heat storage material;
(d) selectively operable fluid transfer means for transferring available heat from said heat storage means to said water in said water heating means; and
(e) control means, including a selectively settable timer means, for operating said fluid transfer means whenever the temperature of said water in said water heating means is less than the temperature of said heat storage material in said heat storage means and is less than a predetermined maximum temperature level, and for maintaining said heating element in a deenergized condition during predetermined time periods determined by the setting of said timer means whereby said water in said water heating means is heated only by available heat obtained from said heat storage means through said transfer means during said predetermined time period.

18. A water heating energy collection and storage system comprising:
(a) a water heating means having a predetermined storage capacity for heated water and having a heating element for heating said water therein;
(b) selectively operable alternate heat source means for generating heat energy;
(c) heat storage means for storing said heat energy generated by said alternate heat source, said heat storage means including a material for storing heat energy and means for transferring the heat generated by said alternate heat source to said heat storage material;
(d) selectively operable fluid transfer means for transferring available heat from said heat storage means to said water in said water heating means; and
(e) control means, including a settable timer means, for programming the energization of said heating element and said alternate heat source, and for programming the operation of said fluid transfer means, in consecutive time frames of twenty-four hours each, with each said time frame being independently programmable to:
  (i) operate said fluid transfer means whenever the temperature of said water heating means is less than the temperature of said heat storage material in said heat storage means;
  (ii) deenergize said heating element during a predetermined time period determined by the setting of said timer means; and
  (iii) energizing said heating element when the temperature of said water in said water heating means is below a predetermined temperature level.

19. A water heating energy collection and storage system comprising:
(a) a water heating means having a predetermined storage capacity for heated water and having a heating element for heating said water therein;
(b) selectively operable alternate heat source means for generating heat energy;
(c) heat storage means for storing said heat energy generated by said alternate heat source, said heat storage means including a material for storing heat energy and means for transferring the heat generated by said alternate heat source to said heat storage material;
(d) selectively operable fluid transfer means for transferring available heat from said heat storage material to said water in said water heating means; and
(e) control means including settable timer means for:
  (i) selectively heating said water in said water heating means solely by energizing said heating element in response to a first predetermined set of conditions within said system;
  (ii) selectively heating said water in said water heating means solely by operating said fluid transfer means in response to a second predetermined set of conditions within said system;
  (iii) selectively heating said water in said water heating means by simultaneously energizing said heating element and by operating said fluid transfer means in response to a third predetermined set of conditions within said system; and
  (iv) maintaining said heating element in a deenergized condition during predetermined time periods determined by the setting of said timer means.

* * * * *

UNITED STATES PATENT OFFICE
CERTIFICATE OF CORRECTION

Patent No. 4,718,403　　　　　Dated January 12, 1988

Inventor(s) Danny McCall

It is certified that error appears in the above-identified patent and that said Letters Patent is hereby corrected as shown below:

Column 1, line 10　delete "typeof" and insert therefor — type of —.

Column 1, lines 55-56　delete "U.S. Pat. Nos. 4,191,166, Jaarem, Buckley 4,399,807 and Kirts 4,339,930" and insert — Jaarem U.S. Pat. No. 4,191,166, Buckley U.S. Pat. No. 4,399,807 and Kirts U.S. Pat. No. 4,339,930 —.

Column 9, line 45　after "differential" add — comparator 116 and sensor signal error detector 116' which checks differential —.

Column 16, line 30　after "control means" add — , —.

Column 16, line 30　after "timer means" add — , — .

Signed and Sealed this

Twenty-first Day of November, 1989

Attest:

JEFFREY M. SAMUELS

Attesting Officer　　　Acting Commissioner of Patents and Trademarks